Jan. 5, 1943.　　C. R. JOHNSON ET AL　　2,307,046
STRIPPING MACHINE
Filed Nov. 1, 1940　　4 Sheets-Sheet 1

Nathaniel C. Wyeth
Charles R. Johnson   INVENTORS
Roland R. Nydegger
BY Thos. A. Wilson
ATTORNEY

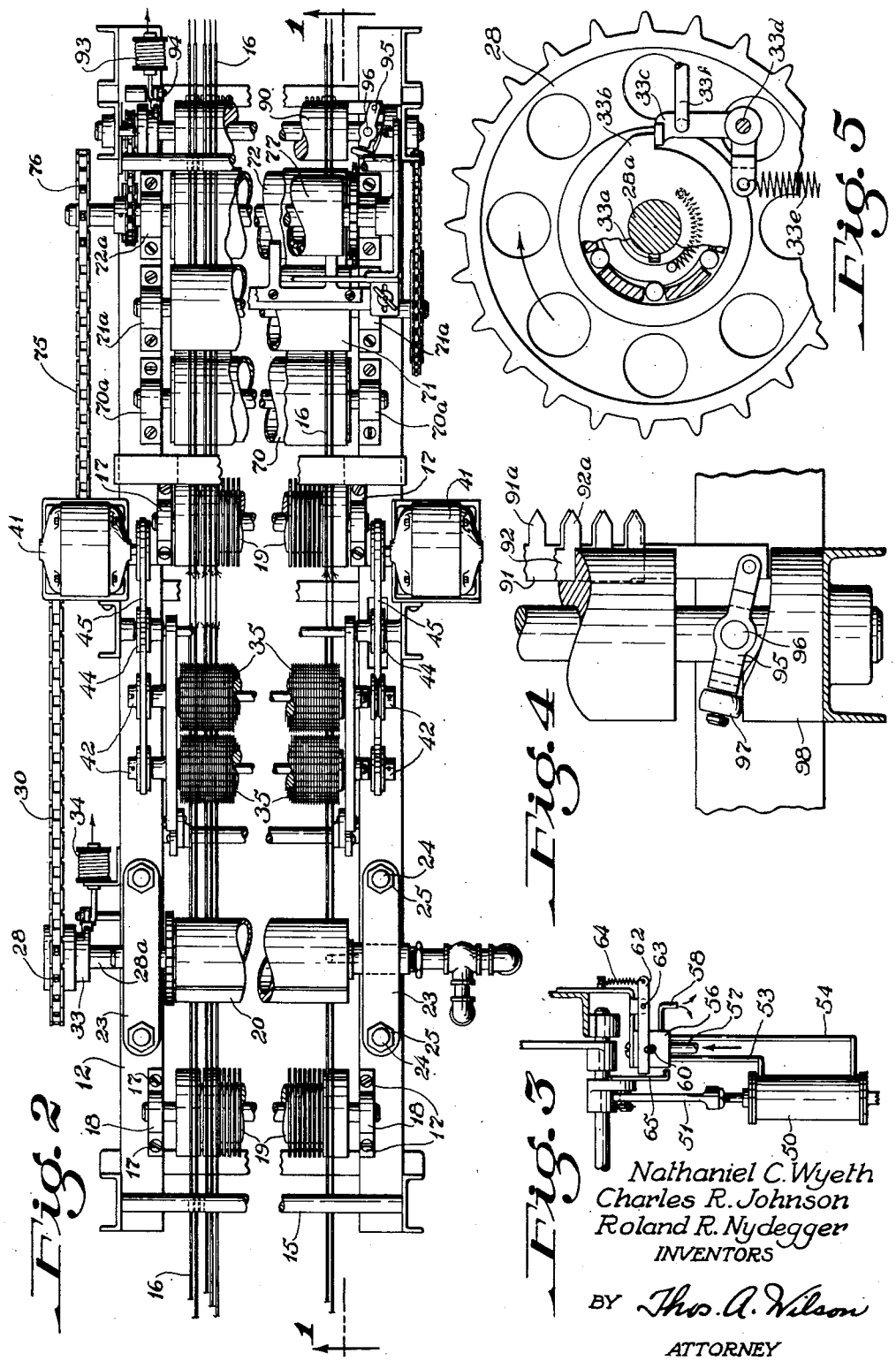

Jan. 5, 1943.   C. R. JOHNSON ET AL   2,307,046
STRIPPING MACHINE
Filed Nov. 1, 1940   4 Sheets-Sheet 3

Nathaniel C. Wyeth
Charles R. Johnson
Roland R. Nydegger
INVENTORS

BY Thos. A. Wilson
ATTORNEY

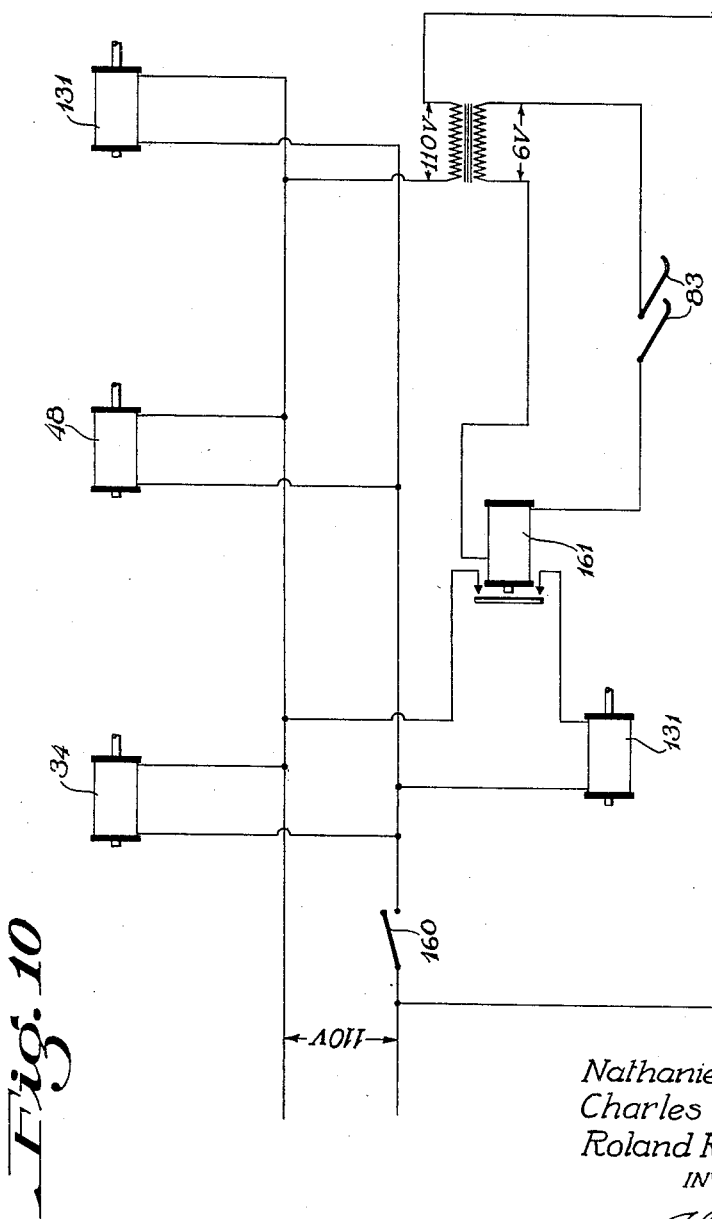

Patented Jan. 5, 1943

2,307,046

UNITED STATES PATENT OFFICE 2,307,046

STRIPPING MACHINE

Charles R. Johnson, Glenn Mills, Pa., Roland R. Nydegger, Wilmington, Del., and Nathaniel C. Wyeth, Paterson, N. J., assignors to E. I. du Pont de Nemours & Company, Wilmington, Del., a corporation of Delaware Application November 1, 1940, Serial No. 363,810

7 Claims. (Cl. 81—9.51)

This invention relates to a wire measuring, stripping, and cutting machine, and more particularly to devices of this kind for use in stripping polymeric organic materials including synthetic resins, thermal softening materials, plastics, and the like, as insulation from the ends of wire and for measuring and cutting it into predetermined lengths.

The use of such polymeric materials as an insulating material for electric-conducting wire is now well recognized and represents an appreciable advance over the conventional insulating materials heretofore employed. Insulating materials of this type have, however, necessitated fundamental changes in equipment and procedure for preparing such wire for commercial use.

In a large number of instances where such products are employed as insulating materials, wires of designated predetermined lengths having their ends stripped of the insulation are required. The prior art methods for removing the insulation from the wire could not be readily adapted to these new insulating materials, and it was, therefore, necessary to devise new means for readily removing the insulation from the ends of the wire. Furthermore, the provision of means for automatically measuring and cutting such wire to a designated predetermined length has not, to our knowledge, been provided. The stripping of the insulation from the ends of the wire and the accurate cutting of the wire into predetermined lengths has many applications which will be readily apparent to those skilled in the art. One such example is provided in the manufacture of leg wires for use with blasting caps.

An object of the present invention is to provide an apparatus for stripping plastic insulation and the like from continuous strands of an electric-conducting wire. A further object is the provision of means for automatically cutting continuous strands of wire into designated predetermined lengths. A still further object is the provision of means for stripping the plastic insulation from a plurality of continuous strands of wire and cutting same into predetermined lengths. A further object of the present invention is the provision of means for stripping a predetermined length of the plastic insulation from a plurality of continuous strands of wire at regular intervals and cutting said wire to predetermined lengths. Other objects will be readily apparent from the description of the invention hereinafter given.

The above objects are accomplished according to the present invention by an apparatus comprising means for pulling the wire through the apparatus, guiding means for said wire as it is being pulled through the apparatus, means for softening and crushing the insulation from the continuous strands of wire after a predetermined length of the wire has passed between the softening and crushing means, means for removing the softened and crushed insulation from the wire, and means for cutting the wire into predetermined lengths, each end thereof having a predetermined length of insulation stripped therefrom.

More specifically, the apparatus provided in accordance with a preferred embodiment of the invention comprises means for pulling the plastic insulated wire through the stripping, measuring and cutting apparatus, said means comprising a series of rolls, an idler roll, an endless belt positioned around said rolls and on which the strands of wire may be placed, and means for rotating said rolls, guiding means for said wire as it is being pulled through the apparatus, means for softening and crushing the insulation from the strands of wire after a predetermined length of wire has passed between the softening and crushing means, said means comprising adjustable steam heated rolls having two outside diameters, the length of arc of the larger diameter of said rolls being equal to the length of the insulation to be removed from the wire, the outside larger and smaller diameters of said rolls in cooperative relationship with each other and the larger diameters, when opposite each other, maintaining sufficient clearance therebetween to allow the free passage of the uninsulated wire but which will soften and crush the insulation thereon, means for rotating the softening and crushing rolls through a single revolution after a predetermined length of said wire has been passed between the rolls, said means being actuated by a continuously operating predetermined counter comprising a set of adjustable predetermining wheels, a counter shaft for actuating the counter and predetermining wheels, a reset shaft for actuating the predetermining and counter wheels, means for actuating the reset shaft, means for actuating the counter shaft, and a counter and reset mechanism for simultaneously actuating the counter shaft and locking the reset shaft whenever the designated length of wire has passed between the crusher rolls and for simultaneously actuating the reset shaft and locking the counter shaft during the resetting of the predetermining counter, means for removing the softened and crushed plastic insulation from the wire, said means comprising adjustable rotating brushes capable of contacting the wire whenever the softened and crushed insulation is under the brushes but which is held away from the insulated wire whenever the uncrushed plastic wire is under the brushes, said means comprising an air actuated piston, means for raising the piston whenever the crusher rolls are actuated, a delayed action member to allow the softened and crushed plastic to travel to the rotating brushes, means for pivoting the upper and lower set of brushes so as to bring them in contact with the wire, means for positioning the brushes out of contact with the wire, and means for rotating the brushes, and means for cutting the wire into predetermined lengths, each end thereof having a predetermined length of insulation stripped therefrom, said means comprising a rotatable roll into which is positioned stationary and movable blades having a plurality of teeth cut thereon, means for rotating the rotatable roll through a single revolution whenever the uninsulated section of wire contacts with the actuating means for the cutting roll, and means for moving the movable knife blade over the stationary knife blade whenever the rotating roll is rotated through a complete revolution.

A specific embodiment of the invention is described hereinafter, reference being made to the accompanying drawings wherein:

Figure 2 represents a plan view of the same.

Figure 3 is an enlarged detail of the air cylinder and means for actuating the adjustable brushes;

Figure 4 represents an enlarged detail of the wire cutting mechanism;

Figure 5 is a detail of a single revolution clutch which is employed to actuate the softening and crushing rolls and the wire cutting means;

Figure 10 represents diagrammatically the electrical means for actuating the stripping, measuring, and cutting apparatus.

Figure 1:
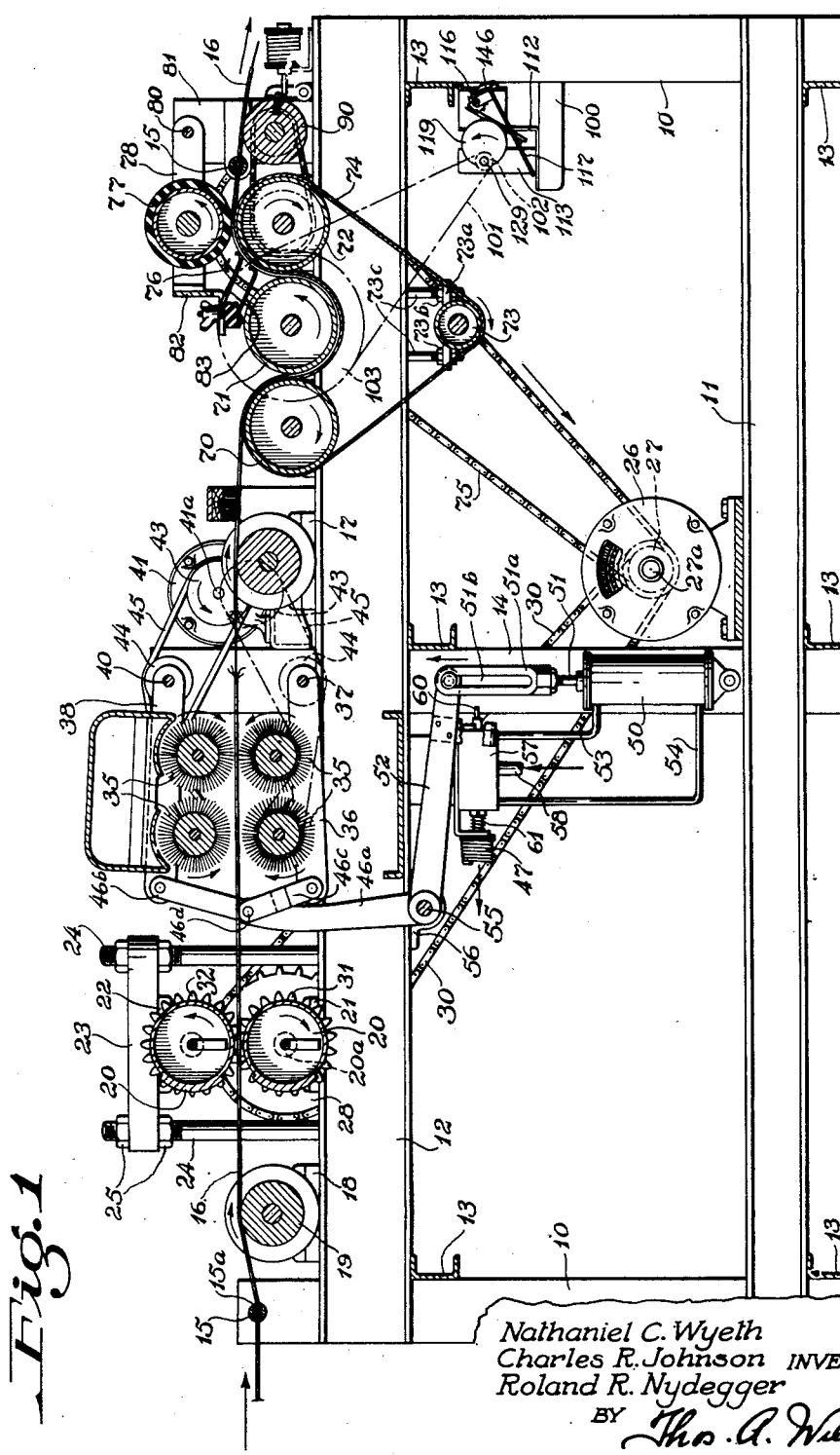
Figure 1 is a side view of the novel stripping, cutting, and measuring apparatus.

In the drawings, wherein like reference characters denote like and similar parts, the end standards or upright 10, 10, the motor supports 11, 11, the main supporting members 12, 12, the cross bracing 13, 13, and the central uprights 14, 14, constitute the main framework of the machine. The framework may, conveniently, be constructed of any material such as steel or wood so long as a substantially rigid structure is provided.

Fitted into the left-hand upright 10, by any convenient means and substantially in the center thereof and extending the width of the machine is a guide member 15, having a plurality of openings 15a cut therein and into each of which may be threaded a continuous strand of plastic coated insulated wire 16. The guide member is preferably constructed of hard metal to prevent excessive wear, and the openings cut therein are substantially horizontal. A similarly constructed guide member is likewise provided at the opposite end of the machine, but instead of having the openings positioned horizontally they are set at an angle with the horizontal so that the wire will fall on the top of the cutting roll which is designated in its entirety by reference character 90.

Mounted on the supporting frame 12, 12 by bolts 17, 17 are pillow blocks 18, 18, and positioned therein in a stationary manner is a grooved roll 19. The roll is circular in cross-section and has a plurality of V shaped grooves cut therein, one for each opening of the guide member 15 and substantially in line therewith. The rolls and guide member serve to guide the wire in a straight line through the machine. While V shaped grooves are preferred, other shapes may be conveniently employed. For best operation, it is preferred that only one wire be placed in each groove.

In order to soften the plastic insulation from the wire prior to the removal thereof, a set of steam heated rolls 20, 20 are provided. These rolls are positioned one above the other, the lower roll being supported in pillow blocks 21, 21 fastened to the frame 12, 12, the upper roll being attached to pillow blocks 22, 22 fastened to the under side of pillow block supports 23, 23 which are adjustably mounted to pillow block support members 24, 24 rigidly fastened to the frame 12, 12. Vertical adjustment of the upper roll is provided by positioning nuts 25, 25 disposed above and below the adjustable pillow block supporting members 24, 24.

These steam heated rolls 20, 20 are provided with two outside diameters. The length of arc of the larger diameter is made equal to the length of the plastic insulation to be stripped from the plastic wire. The remainder of the roll has substantially a smaller diameter. The rolls rotate in opposite directions and co-act in such a manner that the larger diameters are in the same relative position, and, correspondingly, the smaller diameters bear the same relationship one to the other. When the rolls are in vertical operable adjustment, there is just sufficient clearance between the top and bottom rolls, when the larger diameters are opposite each other, to allow the passage therebetween of the uninsulated wire. The plastic coated insulated wire as it passes between the rolls is heated, the plastic composition being softened and crushed. The wire itself, however, is in no way distorted, since the clearance between the rolls is sufficient to allow the uninsulated wire to pass freely between the rolls. When the smaller diameter of the rolls are opposite each other, the plastic coated wire does not come in contact with the steam heated rolls, and the wire passes therebetween unaffected.

Rotation of the rolls 20, 20 takes place simultaneously, and only at those intervals when it is desired to remove the plastic insulation from the wire. The automatic rotation of these rolls is controlled by a novel predetermining counter, the operation of which will be more fully described hereinafter. Rotation of the steam heated rolls is provided by any convenient means such as, for example, by motor 26 mounted on motor supports 11, 11 through sprocket 27 attached to motor shaft 27a, sprocket 28 fastened to the lower steam heated roll shaft 20a, and the travel of the roller chain 30 over sprockets 27 and 28. The upper and lower rolls rotate at the same speed by means of gear 31, attached to the shaft of the lower roll, and gear 32, attached to the shaft of the upper roll which meshes with gear 31. In order to prevent rotation of the steam heated rolls through more than one revolution, a single revolution clutch, denoted in its entirety by reference character 33 and shown in detail in Fig. 5, is provided.

The clutch is fastened to shaft 28a of the lower steam heated roll by key 33a and is prevented from rotating except when a clutch dog stud 33b is out of contact with a clutch dog stud stop 33c. The clutch dog stop is pivoted about pin 33d and is spring loaded by spring 33e to maintain the stop in position so that the clutch dog stud is not free to rotate. In order to release the clutch dog stud and have the shaft rotate with the pulley, a force sufficiently great to overcome the tension of the spring 33e is applied to member 33 by means of solenoid 34, the operation of which will be more fully described hereinafter. Other operable means known to those skilled in the art may, however, be employed. It is essential, however, that the rolls be maintained at all times in cooperative relationship with each other, and that these rolls, when actuated, rotate through only a single revolution.

In the embodiment of the invention herein shown, steam heated rolls are employed. Other means for heating and softening the insulation may be used. Where sufficiently high steam pressures are not available for melting the insulation, electrically heated rolls have been employed. Any well-known means such, for example, as a Johnson steam coupling connected to a steam trap may be employed for maintaining the steam pressure in the rotatable rolls and for removing the condensate therefrom.

The rolls are preferably constructed of metal, being conveniently thick walled cylinders provided with head ends shrunk thereon. The surface of the larger diameter of the rolls is preferably finished smooth, and the transition from the smaller to the larger diameter of the roll is characterized by a sharp edge so as to make a clean cut of the insulation. The wall thickness of the rolls should be sufficiently large to withstand the internal steam pressure in the rolls, and the length of arc of the larger outside diameter of the roll depends on the length of the insulation to be removed from the wire. In operation, the rolls must be maintained in accurate alignment. Vertical alignment is obtained by raising or lowering the adjustable nuts 25, 25.

For removing the softened, crushed insulation from the wire, two sets of pivotal, adjustable rotating brass wire brushes 35, 35 are provided. The lower set of these rolls are journaled in pillow blocks (not shown) which are, in turn, supported on lower brush supporting members 36, 36 which are pivotally mounted on a shaft 37, said shaft being supported in bearing (not shown) in the vertical central upright members 14, 14. The upper rotating brushes, which coact with the lower rotating brushes to remove the crushed plastic insulation from the wires, are similarly constructed, being mounted on pillow blocks which are, in turn, supported by oscillating upper brush support members 38, 38 which are pivotally mounted on a shaft 40, said shaft being supported in the vertical central upright members 14, 14. Rotation of the brushes is provided by any known operable means. In the embodiment of the invention herein shown, each set of brushes is rotated at a constant speed and in opposite directions by motors 41, 41 positioned on the supports 12, 12. Each brush is provided with a grooved pulley 42 which is in line with a pulley 43 rigidly mounted to the motor shaft 41a. Idler pulleys 44, 44, in line with the brush pulley and motor pulleys and fastened to the oscillating shafts 38 and 40, are provided to give sufficient arc of contact to the double V belt 45 employed for rotating brushes.

The brushes are conveniently constructed with brass wire bristles ⅞ of an inch in length, extending radially from the center of the brush, and when in their operable position, i. e., removing the softened crushed insulating material from the wire, slightly overlap each other. When out of their operable position, the brushes are positioned away from each other so as to prevent excessive wear and injury to the plastic insulation covering on the wire. Means for bringing the brushes into and out of contact with each other and the crushed wire is shown in detail in Figs. 1 and 3. Since contact with the insulated wire is to take place only when the softened and crushed plastic insulation is between the brushes, an adjustable brush mechanism is provided. Other arrangements than those disclosed herein may be employed. This adjustment in the present embodiment of the invention is obtained through a link member designated in its entirety by reference character 46, said member comprising a main supporting member 46a, an upper link member 46b pivotally attached to one end of the free end of the upper brush support 38, the other end of which is pivotally attached to the upper end of the main supporting member, and a lower link member 46c which is pivotally attached to the free end of the lower brush support 36, the other end of which is attached to the main supporting member 46a by pin 46d. Movement of the main supporting link member causes the upper and lower links to rotate about the pin 46d, the upper link causing the end of the upper brush support to pivot about shaft 40, and the raising of the lower link member 46c causes the end of the brush support to rotate about the shaft 38, thus bringing the brushes into contact with each other.

Movement of the main supporting link member 46a is provided by a brush actuating means which is operated through a solenoid 47 at the proper time in a manner to be more fully described hereinafter. The actuating means for the brushes comprise an air cylinder 50, a piston (not shown), a piston rod 51, a connecting rod 52, an air inlet 53, and an air outlet 54. The piston rod 51 is actuated by high pressure air, the control of which is provided by the solenoid 48 which is actuated at the same time the solenoid 34 is energized. Since the immediate contacting of the brushes would cause them to bear on the uncrushed wire due to the time lag in pulling the wire from the rolls, a piston rod constructed with a delayed action is provided. The delay is obtained by attaching to the piston rod a member 51a having a slotted opening 51b and into which is fitted one end of the connecting rod 52. The other end of the connecting rod is free to rotate about a pin 55 supported in bearings 56, 56 attached to the under side of the frame 12. The lower link member 46c is rigidly fastened to the connecting rod so that any oscillations thereof causes the main link member to likewise oscillate, and such movement, in turn, oscillates the upper and lower brush supports about their respective shafts in the manner hereinbefore described.

Compressed air from any convenient source is admitted into air chamber 57 through pipe 58, said chamber being provided with openings at either end thereof, one end connecting with the top of an air cylinder 50, while the other end connects with the top of the same cylinder. These connections open and close alternately. Compressed air entering the top port causes the piston to assume a position on the bottom of the air cylinder, while compressed air entering the bottom port positions the piston at the top of the air cylinder. When solenoid 47 becomes energized, it forces solenoid rod 60 to the right (Fig. 1), causing it to compress spring 61. This movement in turn causes the semi-circular recess in a lock lever 62 to ride on the large diameter of the solenoid pin, which lock lever is pivoted about pin 63, and spring loaded by spring 64. When the solenoid becomes energized, the top port closes and the bottom port opens, said operation causing the piston to rise from the bottom of the air cylinder and moving the piston rod in a vertical direction. No movement of the piston rod, however, takes place until the bottom of the slot in the piston rod bears against the connecting rod. As air continues in the cylinder, the piston rod rises, taking with it one end of the connecting rod, which in turn actuates the rotating brushes. Air continues to enter the lower port until a trip pin 65, which is attached to the connecting rod, contacts the lock lever causing it to rotate about the pin 63. Raising of this lever allows the solenoid, through the spring, to return to its original position, thus closing the bottom port and opening the lower port, forcing the piston to assume its lower position in which position it remains until the solenoid is again energized. Air is exhausted from the cylinder out the opening 58.

For pulling the continuous strands of wire through the apparatus, a capstan arrangement comprising rolls 70, 71, and 72, is provided. The rolls are journaled in bearings 70a, 71a, and 72a, which are mounted on the top side of the frame supports 12, 12. A roll 73 of substantially smaller diameter and in the same vertical plane as roll 71 is mounted to the under side of the supporting frame in adjustable bearings 73a, 73a. Simultaneous rotation of the rolls is provided through an endless belt 74 substantially the width of the rolls. The belt passes over rolls 70, 71, and 73 and under roll 71. The continuous strands of wire 16 are placed on top of the belt, and the friction between the rolls and the belt pulls the wire through the apparatus without slipping. The rolls are constructed of metal and one is preferably covered with a hard rubber composition, namely the upper roll just ahead of the cutting shears. Preferably, the peripheral speed of this rubber covered roll is slightly in excess of the speed of the wire as it leaves the capstan. This is to insure that the wires be stretched tightly over the capstan belt as they pass under the electric contact brushes. The capstan is driven by a motor 26 supported on the motor supports 11, 11 by the travel of the belt 75 around motor pulley 27 and pulley 76 attached to shaft of roll 72. Adjustment of the belt 75 is provided by adjustable bearings 73a, 73a by adjusting nuts 73b, 73b, the threads of which cooperate with the threads of bearing supports 73c, 73c.

A bearing roll 77, the vertical center line of which is in the same vertical plane as the center line of roll 72, is provided. This roll is journaled in an adjustable member 78 which is free to pivot about pin 80 mounted in support 81. This roll, when in operable position, is in contact with the strands of wire which are positioned on the top of roll 72 and is preferably constructed of hard rubber. Attached to the end of the adjustable member 78 by any convenient means is an L shaped angle member 82, and fastened thereto, so as to contact the wire as it passes over roll 72, are strips of an electrically conducting metal 83 which actuates a cutting means, the operation of which will be more fully described hereinafter.

For guiding the wire after it is pulled through the machine, a guide member 15, similar to that provided at the front end of the machine, is employed. The wire, on leaving the opening 15a of the guide member, is directed so that it is tangent to the cutting roll 90. The cutting roll has a rectangular shaped groove cut therein and into which is positioned a stationary blade 91 having teeth 91a cut thereon. A horizontal movable blade 92 with teeth 92a is likewise positioned in the groove and is adapted to slide over the stationary blade, thus severing the strands of wire. Whenever a solenoid 93 releases a single revolution clutch 94 it actuates an eccentric 95 (shown in detail in Fig. 4), the eccentric 95 is fastened to the shaft of the cutting roll so that it rotates therewith and, at the same time, is free to oscillate about a pin 96. One end of the eccentric is rigidly fastened to one end of the horizontal, movable knife blade, while the other end has mounted thereon a rotatable roll 97 which rides on a cam 98. Rotation of the roll causes the wheel to follow the cam which, in turn, actuates the movable blade over the stationary blade and cuts the strands of wire between the teeth of the stationary and movable blades.

The solenoid is actuated whenever the strips of electrically conducting metal come in contact with the uninsulated sections of wire as they are pulled through the machine by the capstan. As the solenoid becomes energized, it moves the clutch dog stud stop of the single revolution clutch about the pin 33d against the tension of the spring 33e in a manner hereinbefore described. The solenoid remains energized so long as the uninsulated wire is in contact with the electrical conductor, but as soon as these conductors come in contact with the insulated sections the solenoid becomes de-energized, and the spring 33e positions the stop so that the stud, as it revolves, comes in contact with the clutch dog stud stop and prevents more than a single revolution of the cutting shears.

For accurately measuring the continuous strands of wire into designated predetermined lengths as they are pulled through the machine, a counting apparatus of the predetermining type, the operation and construction of which is fully described and claimed in a copending application Serial No. 363,429, filed October 30, 1940, is provided.

This mechanism comprises a set of adjustable predetermining wheels X, a set of adjustable counting wheels Y, a counter shaft 114 for actuating the counting and predetermining wheels, a reset shaft 116 for resetting the predetermined number on the counting wheels and for replacing the counting wheels to zero, and means for actuating the counter shaft whenever the predetermining counter is counting and for actuating the reset shaft whenever the counter is resetting. The counter is supported on member 100 attached to upright 10 and is actuated through an eccentric drive shaft 129 by the travel of sprocket 101 over the sprocket wheel 102 attached to the eccentric drive shaft 129 and the sprocket wheel 103 attached to shaft 71a of capstan wheel 71.

The automatic predetermining counter is shown in detail in Figs. 6, 7, 8 and 9. Predetermining counter of any well-known operable make, designated in its entirety by reference character 110, is positioned in casing 111. A counter support 112 and a counter eccentric shaft support 113 attached to the counter support 112 are fastened to supporting member 100 and constitute the main framework of the measuring device. The predetermining counter, during the interval of time the counter is counting, is adapted to operate through a counting shaft 114 by any suitable means such, for example, as a spring loaded oscillating counter eccentric follower 115. The oscillations of the shaft 115 carries a series of counting wheels X and predetermining wheels Y, previously set in a relationship designating a predetermined number, to count the oscillations of the counter eccentric follower 115. After the predetermined number of oscillations has been counted off on the counting wheels, a shifting mechanism, the operation of which will be more fully described hereinafter, disengages the counting mechanism and engages a spring loaded reset eccentric follower 117 through a reset shaft 116 which actuates the predetermining wheels and counting wheels and replaces the original settings thereon. The shifting mechanism is controlled by a solenoid 131 which actuates an oscillating shaft 122 whenever the designated predetermined number originally set on the predetermining wheels has been counted off on the counting wheels. The oscillating shaft 122 is supported in bearing blocks 120, 120 and is free to oscillate with a horizontal motion. The shaft has mounted thereon a counter dog collar 126, a reset dog collar 127, a stop 128, and a coil return spring 130, one end of which bears against the left-hand bearing block 120, while the other end is positioned against the stop 128.

The oscillating shaft 129 is held in position against the tension of the coil return spring 130 during the resetting operation by means of a reset lock lever pin 132 which is supported on the reset lock lever support pin 118. The reset lock lever is provided with a circular groove which is positioned so that the groove rides on top of the oscillating shaft whenever the counter is counting but which fits into the groove and holds the oscillating shaft against the tension of the spring whenever the counter is counting.

Figures 8, 9:
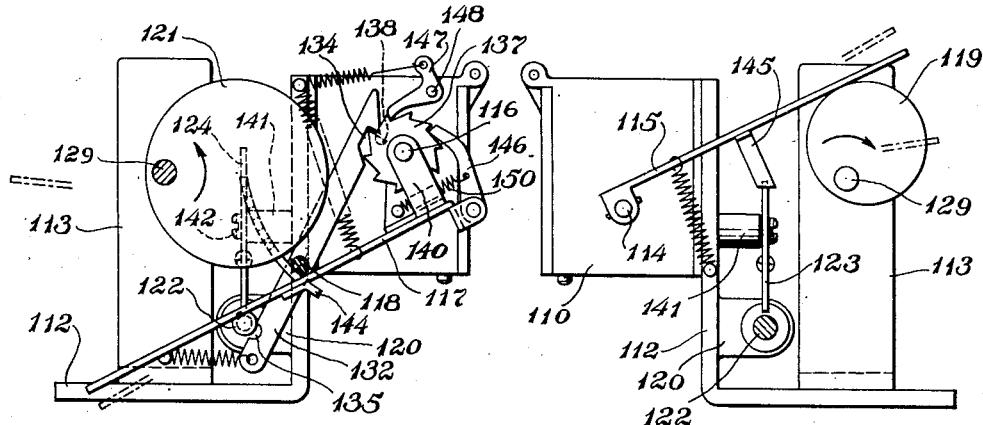
Figure 8 is an end elevation of Figure 7 showing the reset mechanism.
Figure 9 is an end elevation of Figure 7 showing the counting mechanism.
Figure 7:
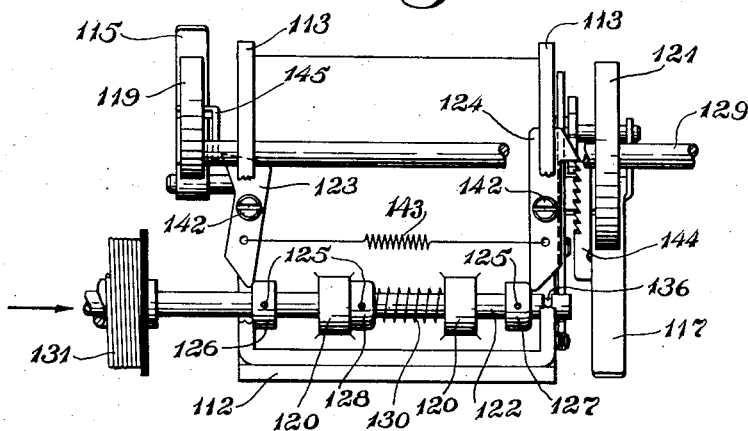
Figure 7 is an elevation of the shifting mechanism employed in actuating the counter and reset mechanism.
Figure 6:
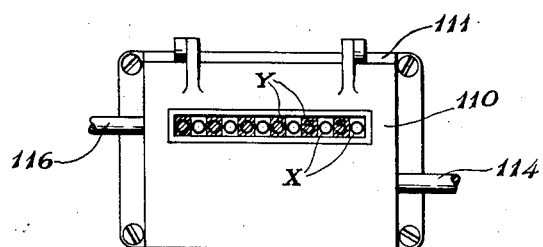
Figure 6 is a front elevation of a predetermining counter.

The oscillating shaft 122 which is actuated by solenoid 131 causes a reset dog 124 and a counter dog 123 to assume new positions. These dogs are mounted to posts 141, 141, said posts in turn being rigidly fastened to the vertical leg of the counter support 112 by any convenient means. These dogs are free to oscillate about bolts 142, 142 and are spring loaded by spring 143 which maintains the dogs in cooperative relationship with each other. The dogs provide the means for maintaining the eccentric follower in position with their corresponding eccentric or for locking the eccentrics out of contact with their corresponding eccentric follower. In the normal or counting position, as shown in Figs. 7 and 9, the counter eccentric follower is in contact with the counter eccentric and the reset eccentric follower is held out of contact with its reset eccentric by the reset dog, which engages in one of the teeth of a ratchet 144 which is attached to the reset eccentric follower by any convenient means. When the reset and counter dogs are out of their normal position, the counter eccentric follower is held out of contact with the counter eccentric by lug 145.

Counter and reset eccentrics 119 and 121 are attached, one at each end, to an eccentric shaft 129 which is, in turn, journaled in openings in the vertical leg of the eccentric shaft support 113 and is rotated by the means hereinbefore described.

The reset eccentric follower is mounted on the reset shaft 116 and is free to oscillate thereon. The free end of the reset eccentric follower, which has a ratchet fitted thereon, is in cooperative relationship with a reset ratchet wheel 137 as the reset eccentric follower is actuated by the reset eccentric through a full stroke ratchet arm 140, which is attached to one end of the reset eccentric follower, rotates the ratchet and the reset shaft through one tenth of a revolution. At the end of the return stroke, the ratchet arm 146 takes up a position engaging the next ratchet notch, the ratchet being held in place by a spring loaded ratchet stop 147 which is free to pivot about pin 148, mounted to the casing 111. Ratchet arm 146 is spring loaded by spring 150 to maintain the ratchet arm in contact with the teeth of the reset ratchet wheel 137.

After the ratchet wheel 137 has made one complete revolution, or correspondingly when the reset eccentric follower 117 has been oscillated 10 consecutive times, a reset lock lever release pin 138 contacts with the pointed end of the reset lock lever 132 causing it to rotate about the reset lock lever supporting pin 118, which in turn raises the semi-circular recess 135 from the groove of the oscillating shaft 129. The coil release spring 130 thereupon returns the oscillating shaft to its normal or counting position, actuating the counter and reset dogs which, in turn, cause the counter eccentric to contact with the counter eccentric follower and simultaneously positions the reset eccentric follower out of contact with the reset eccentric. Under these conditions, the designated predetermined number has been replaced on the predetermining wheels and the counting wheels have been returned to zero. In setting the predetermining wheels, it is to be observed that the setting on the predetermining wheels should be 10 less than the number actually required, since in the embodiment of the invention herein shown it requires 10 consecutive oscillations of the reset eccentric follower to completely reset the counter.

The electrical mechanism for controlling the operation of the crusher rolls, the air cylinder, and the cutting means is shown in detail diagrammatically in Fig. 10, this mechanism being actuated whenever the designated predetermined number has been counted off on the counting wheels of the predetermining counter through the closing of a make and break switch 160 which energizes each of these solenoids in a manner to be more fully described hereinafter.

When solenoid 131 becomes energized, the oscillating shaft 129 through the reset and counter dogs positions the reset eccentric in contact with the reset eccentric follower and locks the counter eccentric follower out of contact with the counter eccentric. Since this solenoid is energized only for a short period of time, that is, when the designated predetermined number is on the counting wheels and thereafter becomes de-energized thus opening the make and break switch, the oscillating shaft is held in the resetting position by a reset lock lever in the manner fully described hereinbefore until the counter has been reset. When the counting wheels are at zero and the predetermining wheels at the designated predetermined number, the coil return spring positions the counter and reset dogs to their normal position and places the counting eccentric in contact with the counter eccentric follower, simultaneously locking the reset eccentric follower out of contact with the reset eccentric.

Closing the make and break switch energizes solenoid 34 which positions the clutch dog stud stop of the single revolution clutch of the crusher rolls out of contact with the clutch dog stud, allowing the shaft to rotate. Since the solenoid is energized only momentarily, the return spring positions the clutch dog stud stop to its normal position before the rolls can make more than a single revolution. As the rolls rotate through a single revolution, the larger diameter of the heated rolls softens and crushes the insulation on the wire.

Solenoid 48, which actuates an air cylinder and the adjustable rotating brushes, likewise becomes energized whenever the make and break switch closes. When the solenoid becomes energized, it forces the solenoid rod 60 against the compression of the spring, thus opening the bottom port of the air cylinder and closing the top port. This operation actuates the piston in the manner hereinbefore described and brings the rotating brushes in contact with the wire and removes the softened and crushed insulation therefrom. As the piston travels vertically, the trip pin fastened thereto contacts the free end of the lock lever and causes it to rotate against the tension in the spring releasing the solenoid rod which is positioned to its normal position by the spring 61. Such movement opens the top port and closes the bottom port, thus positioning the piston at the bottom of the air cylinder unil the solenoid 48 is again energized.

The cutting means for cutting the wire into predetermined lengths is operated through a relay 161 connected to solenoid 93 which becomes energized whenever the elctrical conductors contact with the uninsulated sections of wire as it is being pulled through the machine.

The solenoid actuates the wire cutting means by releasing the clutch dog stud stop from the clutch dog stud of the single revolution type clutch which allows the cutting means to rotate and cut the strands of wire in a manner described hereinbefore.

From the foregoing disclosure, it is believed that the operation of the automatic continuous counting machine herein described will be readily understandable to those skilled in the art. However, briefly, by way of repetition, but without any intent to limit the invention thereto, the following explanation, based on the production of blasting cap leg wires of 28 ft. having 2 inches of stripped wire at each end, is given.

In the operation of the measuring, stripping, and cutting machine herein described, it is first necessary to set the predetermining counter. In the embodiment of the invention herein disclosed, each oscillation of the eccentric follower is equivalent to a section of wire two inches in length.

Likewise, since it requires 10 oscillations of the eccentric shaft to reset the counter to obtain sections of wire 28 ft. in length, it will require a setting on the predetermining wheels of 158, the counting being adjusted to this setting in the usual manner. It will be obvious to those skilled in the art that any other length of wire for each oscillation of the eccentric follower can be made.

The apparatus is next threaded by placing the continuous strands of insulated wire through the machine in the grooves and slots provided, preferably a single wire in each groove, after which the capstan motor is started. As the wire is pulled through the machine, the counting wheels rotate until a reading of 226 is counted off on the counting wheels of the predetermining counter. When such a reading is obtained, solenoid 131 is actuated and shifts the oscillating shaft, locking the counter eccentric follower out of contact with the counter eccentric and positioning the reset eccentric follower in contact with the reset eccentric. The make and break switch closes, and the crusher rolls, through solenoid 34, are actuated so that the rolls rotate through a single revolution, softening and crushing the plastic insulation where the larger diameter of the rolls come in contact with the insulated wire. As the wire continues through the machine, the crushed plastic insulation is brushed from the wire by the rotating brushes which are adjustable through the air cylinder and piston. When uninsulated sections of wire contact with the conductors 83, the solenoid actuating the cutting means becomes energized and the movable knife blade, as it rotates, cuts the wires at the center of the uninsulated sections of wire. Such operation is continued indefinitely until the motor driving the capstan is shut down.

In the use of this novel cutting, measuring, and stripping machine, it will be apparent to those skilled in the art that other means of removing the insulation from the wire or for cutting the wire into predetermined lengths may be employed. It is, therefore, not intended to limit the invention to the embodiment herein described, but the invention broadly contemplates within its scope a measuring, stripping, and cutting machine for the continuous production of predetermined lengths of wire having predetermined lengths of insulation striped from the ends thereof, comprising means for pulling the wire through the apparatus, guiding means for said wire as it is being pulled through the apparatus, means for softening and crushing the insulation from the continuous strands of wire after a predetermined length of the wire has passed between the softening and crushing means, means for removing the softened and crushed insulation from the wire, and means for cutting the wire into predetermined lengths, each end thereof having a predetermined length of insulation stripped therefrom.

While the device has been explained with particular reference to a cutting, stripping, and measuring apparatus employed in the production of blasting cap wires, it is not intended to limit the invention thereto. Any other uses will be readily apparent to those skilled in the art. It is likewise not necessary that the measuring, cutting, and stripping features all be incorporated in a single device. For instance, predetermined lengths of wire having insulation throughout its entire length may be provided by eliminating the softening and crushing rolls and having the counter actuate a relay and a timer which would in turn actuate the solenoid controlling the cutting means.

As many apparently widely different embodiments of this invention may be made without departing from the spirit and scope thereof, it is to be understood that the invention is not limited to the specific embodiments thereof except as defined in the appended claims. Although we have described the operation of the machine in the foregoing, with particular mention of plastic insulation, it is to be understood that the invention is applicable as well to any insulation which may be softened or melted by means of heat, and crushed to facilitate removal; that is, it includes stripping of such materials as cellulose derivative compositions, linear polyamides, and the various synthetic polymeric resinous materials suitable for insulation.

We claim:

1. Apparatus for stripping plastic insulation or the like from the ends of insulated wire and cutting the wire into predetermined lengths comprising means for pulling the insulated wire through the apparatus, guiding means for the wire, means for softening and crushing the insulation from the continuous strands of wire after predetermined lengths of wire have passed between the softening and crushing means, said softening and crushing means comprising adjustable steam-heated rolls having two outside diameters, the length of arc of the larger diameter of said rolls equal to the length of insulation to be removed from the wire, means for rotating the softening and crushing rolls through a single revolution, means for removing the softened and crushed insulation from the wire, and means for cutting the wire into predetermined lengths, each end thereof having a predetermined length of insulation stripped therefrom.

2. Apparatus for stripping plastic insulation or the like from the ends of insulated wire and cutting the wire into predetermined lengths comprising means for pulling the wire through the apparatus, said means comprising a series of rolls, an idler roll, an endless belt positioned around said rolls, and means for rotating said rolls, guiding means for the wire, means for softening and crushing the insulation from the strands of wire after a predetermined length of wire has passed between the softening and crushing means, means for removing the softened and crushed plastic insulation from the wire, and means for cutting the wire into predetermined lengths, each end thereof having a predetermined length of insulation stripped therefrom.

3. Apparatus for stripping plastic insulation or the like from the ends of insulated wire and cutting the wire into predetermined lengths comprising means for pulling the wire through the apparatus, guiding means for said wire, means for softening and crushing the insulation from the continuous strands of wire after a predetermined length of the wire has passed between the softening and crushing means, means for removing the softened and crushed insulation from the wire, said means comprising a set of adjustable rotating brushes, means for rotating the brushes, an air actuated piston, means for raising the piston whereby the brushes are brought into contact with the wire, and means for lowering the piston and placing the brushes out of contact with the wire, and means for cutting the wire into predetermined lengths, each end thereof having a predetermined length of insulation stripped therefrom.

4. Apparatus for stripping plastic insulation or the like from the ends of insulated wire and cutting the wire into predetermined lengths, comprising means for pulling the wire through the apparatus, guiding means for said wire, means for softening and crushing the insulation from the continuous strands of wire after a predetermined length of the wire has passed between the softening and crushing means, means for cutting the wire into predetermined lengths, each end thereof having a predetermined length of insulation stripped therefrom, said means comprising a rotatable roll into which is positioned a stationary and movable knife blade having a plurality of teeth cut thereon, means for rotating the rotatable roll through a single revolution whenever the uninsulated section of wire contacts with the actuating means for the cutting roll, and means for moving the movable knife blade over the stationary knife blade whenever the rotating roll is rotated through a complete revolution.

5. Apparatus for stripping plastic insulation or the like from the ends of insulated wire and cutting the wire into predetermined lengths, comprising means for pulling the insulated wire through the apparatus, guiding means for the wire, means for crushing the insulation from the continuous strands of wire after predetermined lengths of wire have passed between the crushing means, said crushing means comprising adjustable rolls having two outside diameters, the length of arc of the larger diameter of said rolls equal to the length of insulation to be removed from the wire, means for rotating the crushing rolls intermittently, means for removing the crushed insulation from the wire and means for cutting the wire into predetermined lengths.

6. Apparatus for stripping plastic insulation or the like from the ends of insulated wire and cutting the wire into predetermined lengths comprising means for pulling the insulated wire through the apparatus, guiding means for the wire, means for softening and crushing the insulation from the continuous strands of wire after predetermined lengths of wire have passed between the softening and crushing means, said softening and crushing means comprising adjustable heated rolls having two outside diameters, the length of arc of the larger diameter of said rolls equal to the length of insulation to be removed from the wire, means for rotating the softening and crushing rolls intermittently, means for removing the softened and crushed insulation from the wire, and means for cutting the wire into predetermined lengths.

7. Apparatus for stripping plastic insulation or the like from the ends of insulated wire and cutting the wire into predetermined lengths comprising means for pulling the insulated wire through the apparatus, guiding means for the wire, means for crushing the insulation from the continuous strands of wire after predetermined lengths of wire have passed between the crushing means, means for rotating the crushing rolls after a predetermined length of said wire has passed between the rolls, said rotating means being actuated by a continuously operating predetermined counter comprising a set of adjustable predetermining wheels, a set of adjustable counting wheels, a counting shaft for actuating the counting and predetermining wheels, a re-set shaft for actuating the predetermining and counting wheels, and means including a shifting mechanism controlled by a solenoid and comprising an oscillating shaft, a counter dog collar, a reset dog collar, a stop and a coil return spring, a reset dog whereby said oscillating shaft actuated by said solenoid causes said dogs to assume positions for actuating the counting shaft and locking the re-set shaft until the designated predetermined number has been counted off on the counting wheels and thereafter actuating the re-set shaft and locking the counting shaft until the designated predetermined number has been replaced on the predetermining wheels, means for removing the crushed insulation from the wire and means for cutting the wire into predetermined lengths.

CHARLES R. JOHNSON.
ROLAND R. NYDEGGER.
NATHANIEL C. WYETH.